(12) United States Patent
Udagawa

(10) Patent No.: US 6,318,733 B1
(45) Date of Patent: Nov. 20, 2001

(54) METAL LAMINATE GASKET WITH ELASTIC AUXILIARY SEALING MEMBER

(75) Inventor: Tsunekazu Udagawa, Ichikawa (JP)

(73) Assignee: Ishikawa Gasket Co., LTD, Tokyo (JP)

( * ) Notice: Subject to any disclaimer, the term of this patent is extended or adjusted under 35 U.S.C. 154(b) by 0 days.

(21) Appl. No.: 08/924,099

(22) Filed: Sep. 5, 1997

(51) Int. Cl.$^7$ ............................................ F02F 11/00
(52) U.S. Cl. ........................ 277/596; 277/593; 277/594
(58) Field of Search .................... 277/593, 594, 277/596

(56) References Cited

U.S. PATENT DOCUMENTS

| | | | |
|---|---|---|---|
| 3,930,656 | * 1/1976 | Jelinek | 277/593 |
| 4,721,315 | * 1/1988 | Ueta | 277/593 |
| 4,743,421 | * 5/1988 | McDowell et al. | 277/596 |
| 4,830,698 | * 5/1989 | DeCore et al. | 277/596 |
| 4,834,399 | * 5/1989 | Udagawa et al. | 277/595 |
| 5,054,795 | * 10/1991 | Udagawa et al. | 277/895 |
| 5,205,569 | * 4/1993 | Udagawa et al. | 277/595 |
| 5,209,504 | * 5/1993 | Udagawa et al. | 277/595 |
| 5,322,299 | * 6/1994 | Terai | 277/596 |
| 5,451,063 | * 9/1995 | Udagawa et al. | 277/595 |
| 5,700,015 | * 12/1997 | Tensor | 277/591 |
| 5,735,529 | * 4/1998 | Lawrence | 277/596 |

* cited by examiner

Primary Examiner—Lynne H. Browne
(74) Attorney, Agent, or Firm—Kanesaka & Takeuchi

(57) ABSTRACT

A metal laminate gasket is installed in an internal combustion engine having at least one hole therein. The gasket includes a first metal plate, a second metal plate situated over the first metal plate, and an auxiliary sealing member. The first plate includes a base portion, a curved portion to define a first hole, and a flange extending from the curved portion. The flange, the curved portion and a part of the base portion constitute a main sealing portion without substantial elasticity. The second plate has a large second hole and is situated above the base portion of the first plate. The sealing member is situated in a space between an edge of the second hole and the flange. The main sealing portion non-resiliently seals around the hole, while the sealing member resiliently seals outside the main sealing portion, so that even if the engine is made of light metal, the engine is not damaged by the gasket. The gasket can securely seal around the hole.

1 Claim, 1 Drawing Sheet

METAL LAMINATE GASKET WITH ELASTIC AUXILIARY SEALING MEMBER

BACKGROUND OF THE INVENTION AND RELATED ART STATEMENT

The present invention relates to a metal laminate gasket, which is made thin and is provided with an elastic auxiliary sealing member.

An automobile engine has been developed to provide high power with light weight. For this purpose, a cylinder head is made of light metal or alloy, such as an aluminum alloy. Also, a cylinder block may be made of such light metal or alloy.

In case the cylinder head or cylinder block is made of light metal or alloy, the cylinder head or cylinder block is easily damaged by pressure. For example, if high pressure is formed around a cylinder bore, the cylinder bore deforms by the high pressure.

In this respect, since a metal or metal laminate gasket is strong against high temperature, the metal gasket has been gradually used for a small size engine.

In U.S. Pat. No. 4,272,085, a gasket is formed of one metal plate, wherein an area around a cylinder bore is sealed by a thick metal plate, and an elastic sealing member is formed around a fluid hole.

In U.S. Pat. Nos. 4,834,399 and 5,054,795, gaskets formed of two plates have been proposed, wherein areas around holes are sealed by one or two sealing means formed on the plates. The gasket can securely seal around the hole as intended. However, the gasket may not properly seal around a hole or cause damages to engine parts, i.e. cylinder head and/or cylinder block, if the engine parts are made of light metal.

Accordingly, one object of the present invention is to provide a metal laminate gasket for securely sealing around a hole without causing damage to engine parts made of light metal or metal alloy.

Another object of the invention is to provide a metal laminate gasket as stated above, which can securely seal around a hole by two different kinds of sealing devices.

A further object of the invention is to provide a metal laminate gasket as stated above, which has light weight and is simple in structure.

A still further object of the invention is to provide a metal laminate gasket as stated above, which can be easily and economically manufactured.

Further objects and advantages of the invention will be apparent from the following description of the invention.

SUMMARY OF THE INVENTION

A metal laminate gasket of the invention is designed to be installed in an internal combustion engine having at least one hole therein. The gasket is formed of a first metal plate, a second metal plate situated over the first plate, and an auxiliary sealing member formed on the first plate inside the second plate.

The first plate includes a base portion extending substantially throughout an entire area of the engine, a first hole corresponding to the hole of the engine, and a curved portion extending from the base portion to define the first hole. A flange extends from the curved portion in a direction away from the first hole to be situated on a part of the base portion. The flange, the curved portion and a part of the base portion constitute around the first hole a main sealing portion without substantial elasticity.

The second plate includes a second hole with an edge portion. The diameter of the second hole is larger than the diameter of the first hole. Therefore, when the first and second plates are assembled, the flange is located inside the second hole without overlapping the second plate. A space is formed between the flange and the edge portion of the second hole.

The auxiliary sealing member is formed of a non-metallic elastic material and is located in the space inside the second hole. The auxiliary sealing member is not directly exposed to the hole of the engine by the main sealing portion. Therefore, the auxiliary sealing member is not damaged by fluid inside the hole of the engine, such as combustion gas, cooling water and oil.

The thickness of the auxiliary sealing member is greater than the thickness of the flange. When the gasket is tightened, the main sealing portion is substantially non-resiliently compressed, and the auxiliary sealing member is resiliently compressed to seal around the hole.

In the gasket of the invention, the main sealing portion is formed by the flange, a part of the base portion and the curved portion, and is substantially flat. When the main sealing portion is tightened, therefore, the main sealing portion does not provide resiliency but provides equal surface pressure thereon. Thus, the areas of the cylinder head and the cylinder block around the hole are not damaged by the tightening pressure applied thereto.

When the gasket is tightened, the auxiliary sealing member is compressed to the thickness equal to that of the main sealing portion. Therefore, the auxiliary sealing member resiliently seals outside the main sealing member.

In this respect, in case the engine parts, i.e. the cylinder head and the cylinder block, are made of light metal, such as aluminum or aluminum alloy, if a strong force is applied to the engine parts, the engine parts are damaged, i.e. cylinder head or cylinder block may deform. In case the gasket has a hard portion, such as a wire ring or a bead, the engine parts may be damaged by the hard portion. Namely, a dent may be formed by the hard portion of the gasket.

In the present invention, the main sealing portion is substantially flat, and the auxiliary sealing member is formed of non-metallic elastic material. Therefore, when the gasket is tightened, the engine parts are not damaged by the gasket and is sealed properly. The auxiliary sealing member operates as secondary sealing means.

The first plate may include an inclined portion on the base portion outside the flange to surround the first hole. The flange is substantially located on the same plane as the base portion outside the inclined portion. The second plate is located on the base portion at a side opposite to the flange. In this case, two auxiliary sealing members are formed on both sides of the inclined portion.

In the present invention, the main sealing portion may have a little resiliency at the curved portion, or may be formed to constitute a solid portion on the flange. The gasket is especially useful for an engine with a relatively low tightening pressure for tightening the cylinder head to the cylinder block.

DETAILED DESCRIPTION OF PREFERRED EMBODIMENTS

Figure 1:
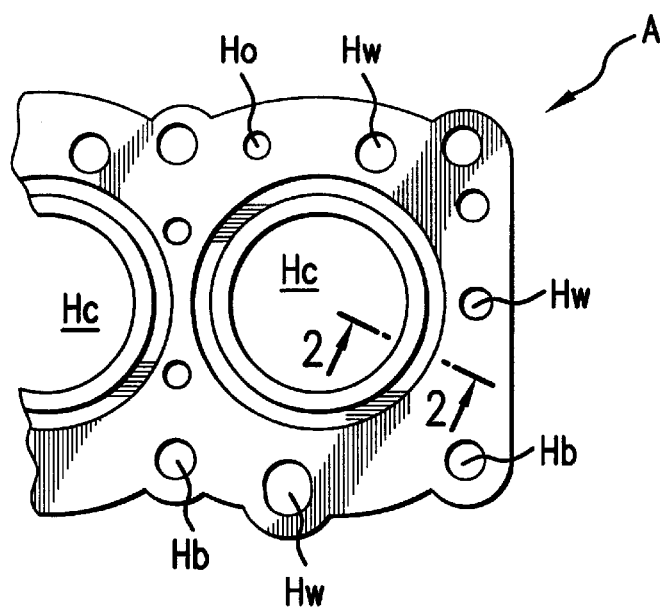
FIG. 1 is a plan view of a part of a first embodiment of a metal laminate gasket of the invention.
Figure 2:
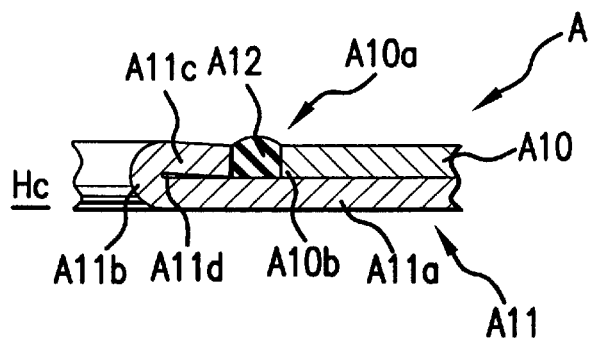
FIG. 2 is an enlarged sectional view taken along line 2—2 in FIG. 1.

Referring to FIGS. 1 and 2, a first embodiment A of a metal laminate gasket of the invention is shown. The gasket A is a cylinder head gasket, and includes cylinder bores Hc, water holes Hw, oil holes Ho and bolt holes Hb, as in the conventional gasket.

The sealing mechanism of the invention is applied around the cylinder bore Hc. The other holes may be sealed by any sealing mechanisms. However, the sealing mechanisms of the invention may be formed around other holes to seal therearound.

As shown in FIG. 2, the gasket A comprises an upper plate A10, a lower plate A11 situated under the upper plate A10, and a resilient sealing member A12. The upper plate A10 extends substantially throughout the entire area of the gasket A, and includes a hole A10a larger than the cylinder bore Hc to be sealed.

The lower plate A11 includes a base portion A11a extending substantially throughout the entire area of the gasket A. The upper plate A10 is located above the base portion A11a of the lower plate A11.

The lower plate A11 further includes a curved portion A11b to define the cylinder bore Hc, and a flange A11c extending outwardly from the curved portion A11b. The flange A11c is situated above the base portion A11a. The flange A11c, the curved portion A11b and a part of the base portion A11a. constitute a main sealing portion around the cylinder bore Hc.

In the gasket A, there is a small space A11d around the curved portion A11b. Therefore, when the gasket A is tightened, the flange A11c is slightly compressed to provide a little resiliency thereat.

In the gasket A, the inner diameter of the hole A10a is larger than the outer diameter of the flange A11c. Therefore, when the upper and lower plates A10, A11 are assembled, an annular space is deformed between the flange A11c and an edge A10b around the hole A10a of the upper plate A10.

The sealing member A12 is applied into the annular space defined by the flange A11c and the edge A10b. The sealing member A12 has an elasticity and is simply situated in the annular space to have a thickness greater than the thickness of the flange A11c.

The sealing member A12 may be an elastomer, such as NBR gum, silicon gum and fluorine gum, or a resilient resin, such as epoxy resin, fluorine resin and acrylic resin.

In the present invention, when the gasket A is tightened between a cylinder head and a cylinder block (both not shown), the flange A11c is completely flatted on the base portion A11a. The main sealing portion formed by the flange A11c, the curved portion A11b and a part of the base portion A11a. is substantially non-resiliently compressed to seal around the cylinder bore Hc, though the curved portion A11b slightly provides resiliency thereat. The sealing member A12 is compressed to resiliently seal around the cylinder bore Hc.

In the gasket A, the main sealing portion has almost no resiliency. Therefore, even if the cylinder head and the cylinder block are formed of light metal, such as aluminum or aluminum alloy, the cylinder head and the cylinder block are not damaged by the main sealing portion. Since the sealing member A12 has resiliency, the sealing member A12 does not cause damage to the cylinder head and the cylinder block. In the gasket A, the cylinder bore Hc is not deformed, nor dents are formed by the gasket.

In the gasket A, since the sealing member A12 is formed outside the main sealing member, the sealing member A12 is not damaged by heat in the cylinder bore Hc. The cylinder bore Ha is resiliently and non-resiliently sealed.

In the gasket A, the thicknesses of the plates A10, A11 are the same. However, if high sealing pressure must be formed around the cylinder bore Hc, the thickness of the plate A10 may be slightly thinner than that of the plate A11, so that the tightening pressure of the gasket A is concentrated around the cylinder bore Hc. The surface pressure at the main sealing portion may be controlled by regulating the thickness of the plate A10.

Even if a high tightening pressure is not applied between the cylinder head and the cylinder block, the sealing member A12 securely seals around the cylinder bore Hc. In this case, the sealing member A12 operates better than a bead.

Figure 3:
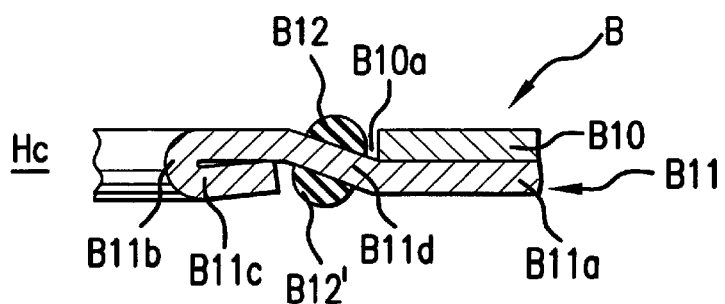
FIG. 3 is a sectional view, similar to FIG. 2, of a second embodiment of the invention.

FIG. 3 shows a second embodiment B of a metal laminate gasket of the invention. The gasket B comprises an upper plate B10 with a large hole B10a, and a lower plate B11 with a curved portion B11b and a flange B11c, similar to the gasket A.

In the gasket B, however, the lower plate B11 is provided with an inclined portion B11d in a base portion B11a, and two sealing members B12, B12' are formed at the inclined portion B11d. In the gasket B, the flange B11c is located in the same horizontal plane as the base portion B11a. The sealing members B12, B12' project over the upper and lower surfaces of the gasket B.

When the gasket B is tightened, the main sealing portion, i.e. the flange B11c, the curved portion B11b and a part of the base portion B11a, around the cylinder bore Hc, and the sealing members B12, B12' are compressed to seal around the cylinder bore Hc. The sealing members B12, B12' seal the respective sides of the gasket B. The rest of the structure and operation of the gasket B is substantially the same as that of the gasket A.

In the present invention, the gasket is provided with a main sealing portion without substantial elasticity, and a resilient sealing member outside the main sealing portion. When the gasket is tightened, the engine parts are not damaged by the gasket, and the gasket can securely seal around the hole.

While the invention has been explained with reference to the specific embodiments of the invention, the explanation is illustrative and the present invention is limited only by the appended claims.

What is claimed is:

1. A metal laminate gasket for an internal combustion engine having at least one hole to be sealed, comprising:
    a first metal plate having a base portion extending substantially throughout an entire area of the gasket, a first hole corresponding to the hole of the engine and situated in the base portion, a curved portion extending from the base portion to define the first hole, a flange extending from the curved portion in a direction away from the first hole to be situated on a part of the base portion and having an outer edge, and an inclined portion formed on the base portion outside the flange so that the flange and the base portion outside the inclined portion are substantially located on a same plane, said flange, said curved portion and a part of said base portion around the first hole constituting a main sealing portion without substantial elasticity, said outer edge of the flange and a lower surface of the inclined portion forming a lower triangular space in a cross section,
    a second metal plate laminated over the base portion of the first plate outside the inclined portion and having a second hole and an edge portion around the second hole, the diameter of the second hole being larger than an outer diameter of the inclined portion so that when the first and second plates are assembled, an upper triangular space in a cross section is formed between an upper surface of the inclined portion and the edge portion of the second metal plate, and first and second annular auxiliary sealing members formed of a non-metallic elastic material and having a semicircular cross section, said first auxiliary sealing member being attached to the upper surface of the inclined portion to be located in the upper triangular space inside the second hole and the second auxiliary sealing member being attached to the lower surface of the inclined portion to be located in the lower triangular space so that the first and second auxiliary sealing members are not directly exposed to the hole of the engine by means of the main sealing portion, the thicknesses of the first and second auxiliary sealing members being greater than the thickness of the flange so that when the gasket is tightened, the main sealing portion is substantially non-resiliently compressed to seal around the hole and the first and second auxiliary sealing members are compressed in the respective upper and lower triangular spaces to resiliently seal around the hole.

* * * * *

UNITED STATES PATENT AND TRADEMARK OFFICE
CERTIFICATE OF CORRECTION

PATENT NO. : 6,318,733 B1
DATED : November 20, 2001
INVENTOR(S) : Tsunekazu Udagawa It is certified that error appears in the above-identified patent and that said Letters Patent is hereby corrected as shown below:

<u>Column 3,</u>
Line 38, change "deformed" to -- formed --; and
Line 54, change "Alla." to -- Alla --.

Signed and Sealed this

Thirtieth Day of April, 2002

Attest:

Attesting Officer

JAMES E. ROGAN
*Director of the United States Patent and Trademark Office*